United States Patent Office 3,107,318
Patented Oct. 15, 1963

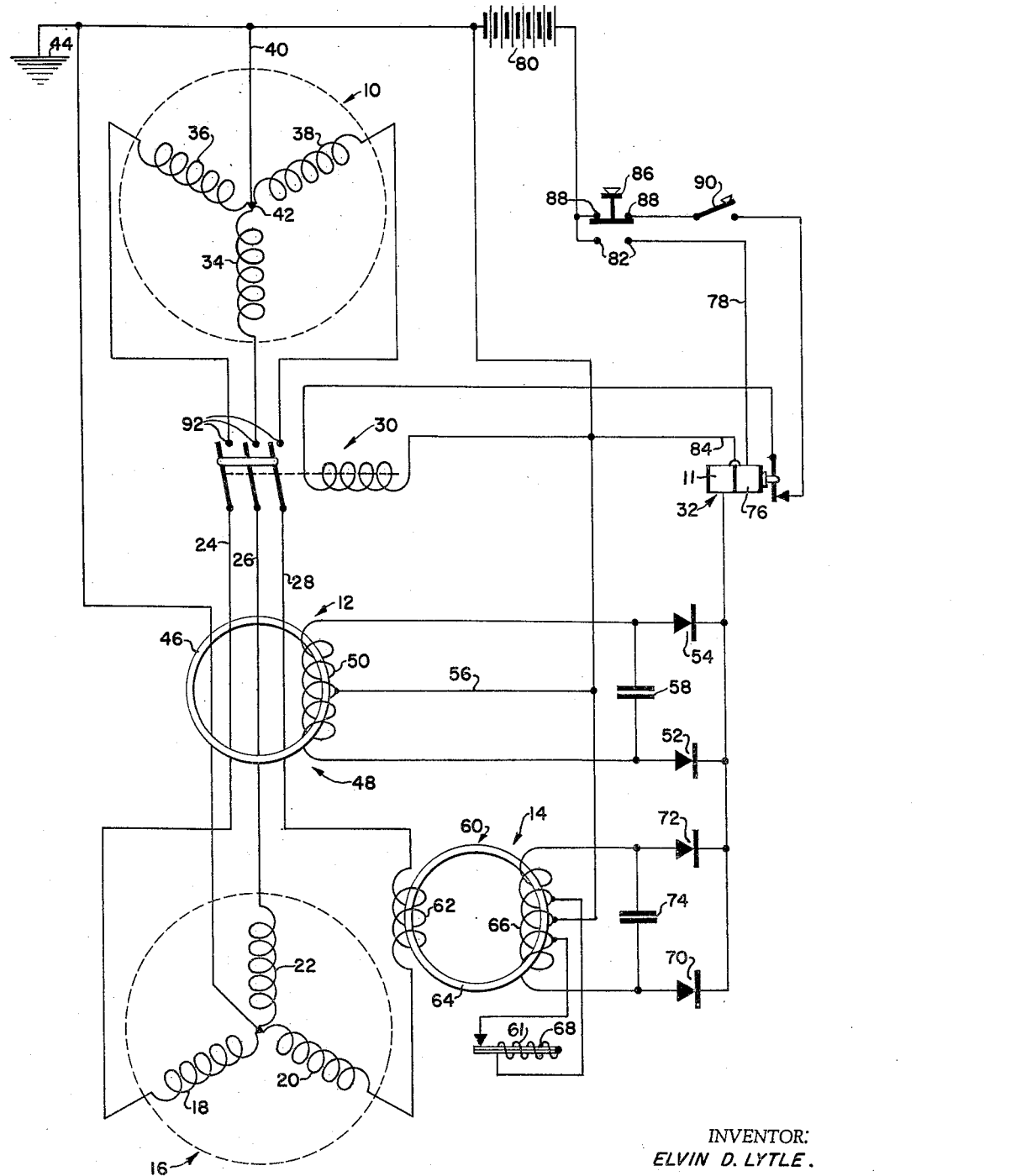

3,107,318
PROTECTIVE CIRCUIT ARRANGEMENT
Elvin D. Lytle, Los Angeles, Calif., assignor to The Garrett Corporation, Los Angeles, Calif., a corporation of California
Filed Apr. 10, 1959, Ser. No. 805,516
10 Claims. (Cl. 317—13)

The present invention relates to protective circuit arrangements and more particularly to protective circuit arrangements for electrical equipment adapted to be connected to a power supply source.

Current detection devices are commonly employed to protect electrical equipment from excessive electrical currents. In many instances the protection is provided to prevent excessive electrical currents in the equipment resulting from a malfunction in a supply circuit or in the electrical equipment itself. Although current detection devices have been found to be adequate in most instances, in certain applications it has been found that time of response to excessive currents is too slow for proper protection of the electrical equipment and associated or surrounding apparatus. A thermal overload relay, for example, is commonly employed to protect motors in industrial application where a five to ten second delay is not uncommon before the supply circuit to the equipment is broken or opened to prevent damages resulting from excessive fault currents. Although a five to ten second delay will not cause excessive damage to most electrical equipment and the time of response is considered adequate, it has been found that light electrical equipment, lighter than the equipment used in many industrial applications, will be partially or completely destroyed during a five or ten second delay in response to excessive fault currents. Often the damage is extended where the light electrical equipment is placed in hazardous locations. A fault current in light electrical equipment can produce extensive damage to the equipment and surrounding apparatus if the current detection devices providing the protective circuit arrangements do not have a sufficiently fast time response to fault currents. Light electrical motors, for example, having an aluminum casing approximately one-eighth inch thick, have melted the casing and the molten aluminum strewn a distance of twenty feet upon being subjected to fault currents.

An object of the present invention therefore is the provision of a protective circuit arrangement for electrical equipment.

Another object is to provide a protective circuit arrangement for electrical equipment adapted to be connected to a power supply source wherein excessive currents actuate the circuit arrangement to disconnect equipment from the power supply source.

A further object of the invention is the provision of a protective circuit arrangement including overload current detection means responsive to load currents in the equipment to produce a signal current output which is a function of the load currents in the equipment.

Still another object is to provide a protective circuit arrangement for electrical equipment including circuit means responsive to faults in the equipment producing ground currents wherein the circuit produces a signal output instantaneously in response to the ground currents to disconnect electrical equipment from an associated power supply source.

A still further object of the present invention is the provision of circuit arrangement for detecting ground currents and excessive overload currents in the equipment to produce a signal output exceeding a predetermined amount to actuate control means disconnecting the electrical equipment from a power supply source.

Another object is to provide a protective circuit arrangement responsive to the temperature of electrical equipment in addition to the current in the equipment wherein a signal output is produced which is a function of the combination of the temperature and current to control the supply of power to the electrical equipment.

Referring now to the drawing, a preferred embodiment of the protective circuit arrangement for three phase electrical equipment has been shown connected to a suitable three phase alternating current power supply source 10. Fault detection circuit means 12 has been provided for sensing ground currents in the electrical equipment while overload current circuit detecting means 14 is responsive to excessive currents supplied to the electrical equipment or a combination of excessive currents and temperature of the electrical equipment. In the preferred arrangement, the electrical equipment has been shown as a three phase motor 16 having its windings 18, 20, 22 connected to the power supply source 10 by supply lines 24, 26 and 28 through the contacts 92 of a contactor 30.

The energizing circuit for the operating coil of the contactor 30 is completed through the contacts of a latched closed, direct current relay 32 having an opening coil 11 coupled to the fault and overload detection means 12 and 14. The relay 32 further includes a reset coil 76 for returning the contacts of the relay to their latched closed position.

Referring to the drawing for a more detailed description of the circuit arrangement providing the protection for electrical equipment, the power supply source 10 has been shown as a three phase generator having windings 34, 36 and 38 shown connected to a neutral line 40 at a common point 42 to form a Y circuit. The neutral line 40 is connected to a ground 44. The opposite ends of the windings of the generator are connected to the supply lines 24, 26 and 28 which along with the neutral, pass through a core 46 of a differential current transformer 48 forming a portion of the current detector circuit arrangement for the fault detection circuit means 12. The supply lines passing through the core and the neutral line connection form individual primary windings, each providing a single turn on the differential current transformer having a secondary winding 50. The secondary winding is connected to a full wave, center tapped rectifier circuit including rectifiers 52 and 54 and the center tap connection 56. Capacitor 58 is connected across the secondary winding 50 to suppress switching and arcing transients. The capacitor 58 suppresses higher frequency transients while the decrease in sensitivity of the output of the differential current transformer is negligible at the supply frequency.

The fault detector circuit arrangement including the differential transformer 48 will detect any unbalance in the currents flowing in the primary windings passing through the core 46 and will thus sense any ground current flowing in the electrical equipment. Preferably the transformer 48 includes a saturable core to prevent excessive currents in the coil of the relay 32 and to limit the voltages on rectifiers 52 and 54. Any ground current exceeding a predetermined minimum will actuate the relay 32 to open the circuit to the motor 16 from the power supply source.

One or more of the supply lines connecting the motor to the power supply source is coupled to another current transformer which forms a part of the overload circuit detection arrangement 14. In the present embodiment as shown by the drawing, a single supply line 28 is coupled to an overload current transformer 60 by a primary winding 62. Preferably the overload current transformer includes a saturable core 64 coupling the primary to a secondary winding 66. The current detector of the overload circuit arrangement has been shown as a thermal detector element 68 which preferably is located adjacent the motor 16 whereby the overload current circuit is responsive to the combination of the current supplied to at least one winding of the motor and to the motor temperature. The thermal detector 68 as shown, comprises a bimetallic element which is coupled to intermediate taps on the secondary 66 of the overload transformer through a heating coil 61. The current coupled to the transformer 60 is a function of the current in the supply line 28 which in most instances will be proportional to the current supplied to the motor from the power supply source. The resistance of the thermal detector 68 and heating coil 61 is proportioned to prevent the voltage appearing across the secondary 66 to rise to a level that can actuate relay 32. The secondary 66 of the overload current transformer 60 is connected to a full wave center tapped rectifier circuit including the rectifiers 70 and 72 for converting the alternating current output to a direct current for energizing coil 11 of the direct current relay 32. Capacitor 74, connected across the secondary of the transformer, is provided to suppress higher frequency transients without excessively attenuating the output of the overload current detector circuit.

In the operation of the overload circuit arrangement, an increase in current through the supply line 28 or an increase in the temperature of the motor 16, or the combination of the increase in temperature of the motor and increase in current supplied to the motor produces an increase in temperature of the thermal element of the thermal detector 68 by the heat produced by the heating coil 61, the heat produced by the motor, or the combination of the heat produced by the motor and the heat produced by the heating coil, thereby causing the thermal current detector to open that portion of the secondary of the overload current transformer which it shunts. The opening of the circuit through the thermal detector increases the voltage across the secondary winding 66 to a predetermined voltage level for actuating the control relay 32.

Either the fault detector circuit or the overload protector circuit is capable of actuating the control relay 32 in response to predetermined ground currents or overload currents. Normally, the level of voltage necessary for actuating the control relay is greater than the output of the overload arrangement during starting of the motor 16. Thus, the output of the overload circuit in response to normal motor operation, including motor starting and other transient conditions, is insufficient to actuate the control relay while the thermal detective device is closed, but sufficient to actuate the control relay with the thermal switch open at the minimum operation current of the motor. Preferably, the thermal detector 68 has a heat to mass ratio approximating that of the motor windings whereby a suitable time delay is provided to prevent unnecessary operation of the control circuit disconnecting the power source from the motor. Motor starting currents will not trip the thermal detector, under normal conditions, since the combination of temperature of the motor and heating from the current through the heating coil 61 is insufficient to actuate the thermal element within the normal starting period.

The control relay 32 includes both an opening coil 11 and a reset coil 76. The reset coil is connected to a reset circuit including a lead 78 connecting the reset coil to a D.C. supply source 80 through normally open switch contacts 82. The opposite side of the reset coil is connected to ground 44 through a common line 84. As shown in the drawing, a manually operated two position push button switch 86 normally connecting stationary contacts 88 in the circuit of the contactor 30, completes the circuit to the reset winding of relay 32 through contacts 82. The operating coil of the contactor 30 is connected to the D.C. source 80 through an operating switch 90 and the contacts of the control relay 32.

The operating switch 90 completes the circuit to the operating coil of the contactor 30 from the D.C. supply source 80 to close the contacts 92 and connect the motor 16 to the supply source 10. During normal operation, the power supply source supplies the current to the motor without interruption whereby the motor can drive a suitable output means such as a compressor or pump. Should a fault occur, the differential transformer 48 will detect any unbalance in the currents flowing through the primary windings, i.e. the supply lines passing through the core 46. The rectifier circuit in the fault detector circuit will produce a D.C. output current in response to the ground currents detected by the transformer 48 to energize the coil 11 sufficiently to effect opening of the control relay 32. In order to prevent damage to the control relay, the core 46 is saturable whereby the current in the secondary winding 50 is limited to a safe value.

The protective circuit arrangement 14 senses overload currents by the overload circuit arrangement which is shown connected to the supply line 28 by the primary of an overload current transformer 60. A portion of the currents supplied to the motor in this line will be coupled to the secondary 66 of the transformer and to the thermal detector 68 which is responsive to the motor temperature and motor current. Excessive current and time exceeding a predetermined level, or the combination of excessive current and temperature of the motor or excessive temperature of the motor alone will actuate the thermal protective element to open the secondary shunt circuit to produce an increased output voltage across the secondary. The output from either the fault detector circuit or the overload protective circuit will actuate the control relay 32 to open the relay contacts and the circuit from the power supply source 80 to the operating coil of the contactor 30. This effects opening of the contacts 92 to disconnect the power supply source 10 from the motor 16 to protect the motor from excessive currents due to ground fault or to overload currents.

It will be seen that the opening of contacts 92 due to the operation of fault detection circuit means 12 will be effected substantially instantaneously without time delay other than that inherent in the magnetic and mechanical response of the system. On the other hand, opening of the contacts 92 due to operation of the overload protective arrangement 14 will be effected with a time delay corresponding to the period of time required for the particular overload current flowing through heating coil 61 to effect opening of the circuit controlled by the thermal detector 68.

Although the preferred circuit arrangement as set forth above is directed to an overload current detector which senses both the temperature of the electrical equipment or motor and the current supplied to at least one winding of the motor, it is readily apparent that the overload detector arrangement need not be sensitive to the combination if it is either unnecessary or undesirable to detect one or the other. If it is undesirable to detect temperature, for example, current sensitive elements would be substituted for the thermal detector 68 whereby the overload circuit arrangement would be sensitive only to the current supplied to the associated motor windings.

If is desired, additional detector or sensing elements actuating switches, such as pressure sensitive switches, can be placed in series with the thermal detector 68 or in lieu thereof. A pressure switch would sense predetermined pressures to open the circuit across the intermediate taps on the secondary winding 66 to raise the voltage level across the secondary winding for actuating the relay 32.

In the light of the above teaching, various modifications and variations of the present invention are contemplated and are apparent to those skilled in the art without departing from the spirit and scope of the invention.

I claim:
1. A protective circuit arrangement for electrical equipment adapted to be connected to a power supply source comprising: fault circuit means including a differential transformer coupled to said electrical equipment for sensing electrical ground currents produced by ground faults in the equipment, said fault circuit means being responsive to ground currents in said equipment to produce first signal output; overload circuit means including a current transformer having a primary winding coupled to the electrical equipment and thermal current means coupled to the secondary winding for detecting at least a portion of the current in the electrical equipment, said thermal current means being located to detect the temperature of the equipment, said overload circuit means being responsive to predetermined combinations of current and temperature to produce a second signal output, supply circuit control means for connecting the equipment to said source and coupled to said fault and overload circuit means, said control means being responsive to a predetermined value of either signal output to disconnect the electrical equipment from said supply source.

2. A protective circuit arrangement for electrical equipment adapted to be connected to a power supply source comprising: fault circuit means coupled to said electrical equipment for sensing electrical ground currents produced by ground faults in the equipment, said fault circuit means being responsive to ground currents to produce a first signal output, overload circuit means including a current transformer having a primary winding coupled to the electrical equipment, a secondary winding on said transformer for producing a second signal output, thermal current means shorting at least a portion of said secondary winding and opening in response to a predetermined relation of overload current and time to produce said second signal output, and supply circuit control means for connecting the equipment to said source and coupled to said fault and overload circuit means, said control means being responsive to a predetermined value of either signal output to disconnect the electrical equipment from said supply source.

3. A protective circuit arrangement for electrical equipment adapted to be connected to a power supply source comprising: fault circuit means coupled to said electrical equipment for sensing electrical ground currents produced by ground faults in the equipment, said fault circuit means being responsive to ground currents to produce a first signal output, overload circuit means including a current transformer having a primary winding coupled to the electrical equipment, a secondary winding on said transformer for producing a second signal output, thermal current means shorting at least a portion of said secondary winding and opening in response to a predetermined relation of overload current and time to produce said second signal output, a contactor for connecting the equipment to said source, a relay controlling the energizing circuit for said contactor, and circuit means coupling said fault and overload circuit means to said relay to apply said signal outputs thereto, said relay operating upon a predetermined value of either signal output to de-energize said contactor.

4. A protective circuit arrangement for electrical equipment as defined in claim 3 in which said relay is direct current operated and said last mentioned circuit means includes parallel rectifier circuits connecting each of said fault and overload circuit means to said relay.

5. A protective circuit arrangement for electrical equipment adapted to be connected to a power supply source comprising: fault circuit means coupled to said electrical equipment for sensing ground currents, said fault circuit means being responsive to ground currents instantaneously to produce a first signal output; overload circuit means including a current transformer having a primary winding coupled to the electrical equipment and thermal current means coupled to the secondary winding for detecting at least a portion of the current in the electrical equipment, said thermal current means being located to detect the temperature of the equipment, said overload circuit means being responsive to predetermined combinations of current and temperature to produce a second signal output; and control means coupled to said fault and overload circuit means and responsive to either signal output to disconnect the power supply source from the electrical equipment.

6. A protective circuit arrangement for electrical equipment adapted to be connected to a power supply source comprising: fault circuit means coupled to said equipment for sensing ground currents, said fault circuit means being responsive to ground currents instantaneously to produce a first signal output; overload circuit means including a current transformer having a primary winding coupled to the electrical equipment; a secondary winding on said transformer for producing a second signal output; thermal current means shorting at least a portion of said secondary winding and opening in response to a predetermined relation of overload current and time to produce said second signal output; and control means coupled to said fault and overload circuit means and responsive to either signal output to disconnect the supply source from the electrical equipment.

7. A protective circuit arrangement for electrical equipment adapted to be connected to a power supply source comprising: fault circuit means coupled to said equipment for sensing ground currents, said fault circuit means being responsive to ground currents instantaneously to produce a first signal output; overload circuit means including an overload current transformer having a primary winding coupled to the equipment for detecting at least a portion of the load currents in the equipment; a secondary winding on said transformer; thermal current means shorting at least a portion of said secondary winding and opening in response to a predetermined relation of overload current and time to produce a second signal output; and control means for connecting the equipment to the supply source, said control means being coupled to said fault circuit means and said secondary winding and responsive to either signal output to disconnect the electrical equipment from the power supply source.

8. A protective circuit arrangement for electrical equipment adapted to be connected to an alternating current power supply source comprising: fault circuit means coupled to said equipment for sensing ground currents, said fault circuit means being responsive to ground currents instantaneously to produce a first signal output; overload circuit means including rectifier circuit means coupled to the equipment for detecting at least a portion of the load currents in the equipment to produce a signal current, said overload circuit means being responsive to a signal current exceeding a predetermined amount to produce a direct current signal output; a contactor for connecting the equipment to said source; a direct current operated relay controlling the energizing circuit for said contactor; and circuit means including parallel rectifier circuits connecting each of said fault and overload circuit means to said relay for coupling said fault and overload circuit means to said relay so as to apply said signal outputs thereto, said relay operating upon a predetermined value of either signal output to de-energize said contactor.

9. A protective circuit arrangement for electrical equipment adapted to be connected to a power supply source comprising: fault circuit means coupled to said electrical equipment for sensing electrical ground currents produced by ground faults in the equipment, said fault circuit means being responsive to ground currents in said equipment to produce a first signal output; overload circuit means including an alternating current transformer, said transformer including an alternating current conductor which constitutes the primary winding of said transformer; a secondary winding on said transformer arranged for magnetic coupling with the primary winding of said transformer; low impedance circuit means coupled across turns of said secondary winding whereby a substantially zero insertion impedance is presented to the alternating current conductor to which it is magnetically coupled by substantially nominal magnetization flux; means for opening said low impedance circuit means so that magnetic flux builds up rapidly to provide a utilizable voltage at said secondary output terminals whereby said overload circuit means is responsive to a current exceeding a predetermined amount to produce a second signal output; and supply circuit control means coupled to said fault and overload circuit means and responsive to a predetermined value of either signal output to disconnect the electrical equipment from said supply source.

10. A protective circuit arrangement for electrical equipment adapted to be connected to an alternating current power supply source comprising: fault circuit means including a current transformer; a plurality of input windings on said transformer, one of said windings being connected in a neutral conductor to said equipment, the other of said windings being connected in current supply conductors to said equipment, said fault circuit means being responsive to unbalanced currents in said conductors upon the occurrence of a fault in the power circuits within said equipment so as to produce a first signal output; overload circuit means including a current transformer having a primary winding coupled to the electrical equipment and thermal current means coupled to the secondary winding for detecting at least a portion of the current in the electrical equipment, said thermal current means being located to detect the temperature of the equipment, said overload circuit means being responsive to predetermined combinations of current and temperature to produce a second signal output; a contactor for connecting the equipment to said source; a direct current operated relay controlling the energizing circuit for said contactor; and circuit means including parallel rectifier circuits connecting each of said fault and overload circuit means to said relay so as to apply said signal outputs thereto, said relay operating upon a predetermined value of either signal output to de-energize said contactor.

References Cited in the file of this patent
UNITED STATES PATENTS

| | | |
|---|---|---|
| 1,693,379 | Gano | Nov. 27, 1928 |
| 1,696,289 | Wood | Dec. 25, 1928 |
| 1,818,337 | Kribs | Aug. 11, 1931 |
| 1,888,718 | Friedlander | Nov. 22, 1932 |
| 2,238,570 | Schweitzer | Apr. 15, 1941 |
| 2,255,678 | Ratz | Sept. 9, 1941 |
| 2,280,945 | Gamel | Apr. 28, 1942 |
| 2,445,577 | Haug | July 20, 1948 |
| 2,689,316 | Gillespie | Sept. 14, 1954 |
| 2,817,794 | Amundson | Dec. 24, 1957 |
| 2,871,414 | Wallace | Jan. 27, 1959 |